United States Patent [19]
Winderl

[11] 4,039,848
[45] Aug. 2, 1977

[54] WIND OPERATED GENERATOR

[76] Inventor: William R. Winderl, 124 1st N., Glasgow, Mont. 59230

[21] Appl. No.: 630,094

[22] Filed: Nov. 10, 1975

[51] Int. Cl.² ............................................. F02N 11/04
[52] U.S. Cl. ..................................... 290/55; 416/119
[58] Field of Search ....................... 290/44, 55, 54, 43; 416/119

[56] References Cited

U.S. PATENT DOCUMENTS

| | | | |
|---|---|---|---|
| 774,168 | 11/1904 | Forander | 290/44 |
| 1,894,357 | 1/1933 | Mainkowske | 290/44 |
| 2,177,801 | 10/1939 | Erren | 290/55 |
| 3,974,396 | 8/1976 | Schönball | 290/54 |

Primary Examiner—B. Dobeck
Attorney, Agent, or Firm—Schroeder, Siegfried, Ryan & Vidas

[57] ABSTRACT

A wind operated generator employing counterrotating propellers with an alternating current generator positioned between the blades of the propellers and spacing the same. The propellors and generator parts are mounted on concentric shafts supported in a positive drive structure in which the shafts are tied together through gearing to insure positive starting and counterrotation of the propellers in a positive equal drive system. A governor associated with one of the shafts governs the operational speed of rotation of both propellers to protect the propellers and generator.

10 Claims, 4 Drawing Figures

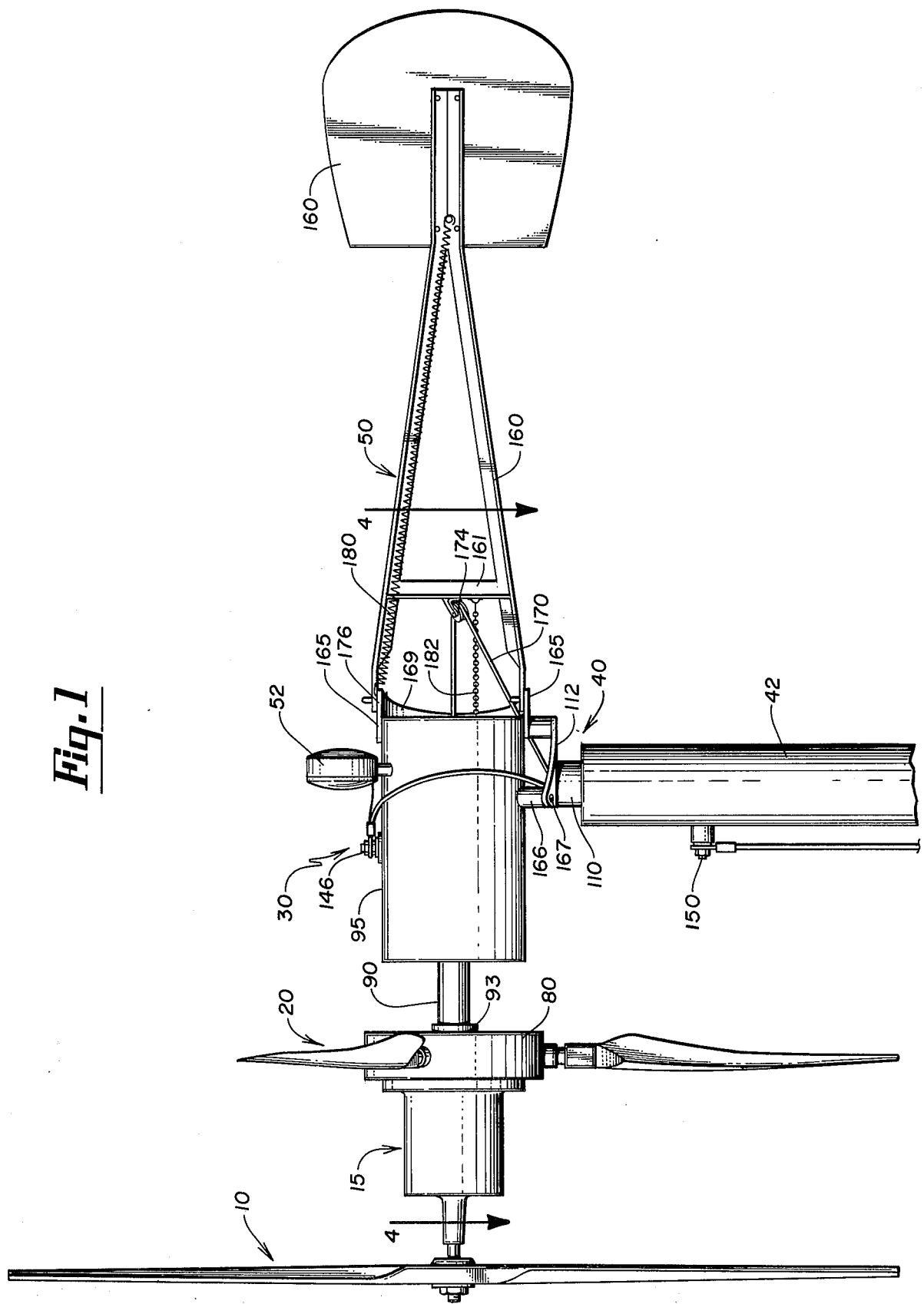

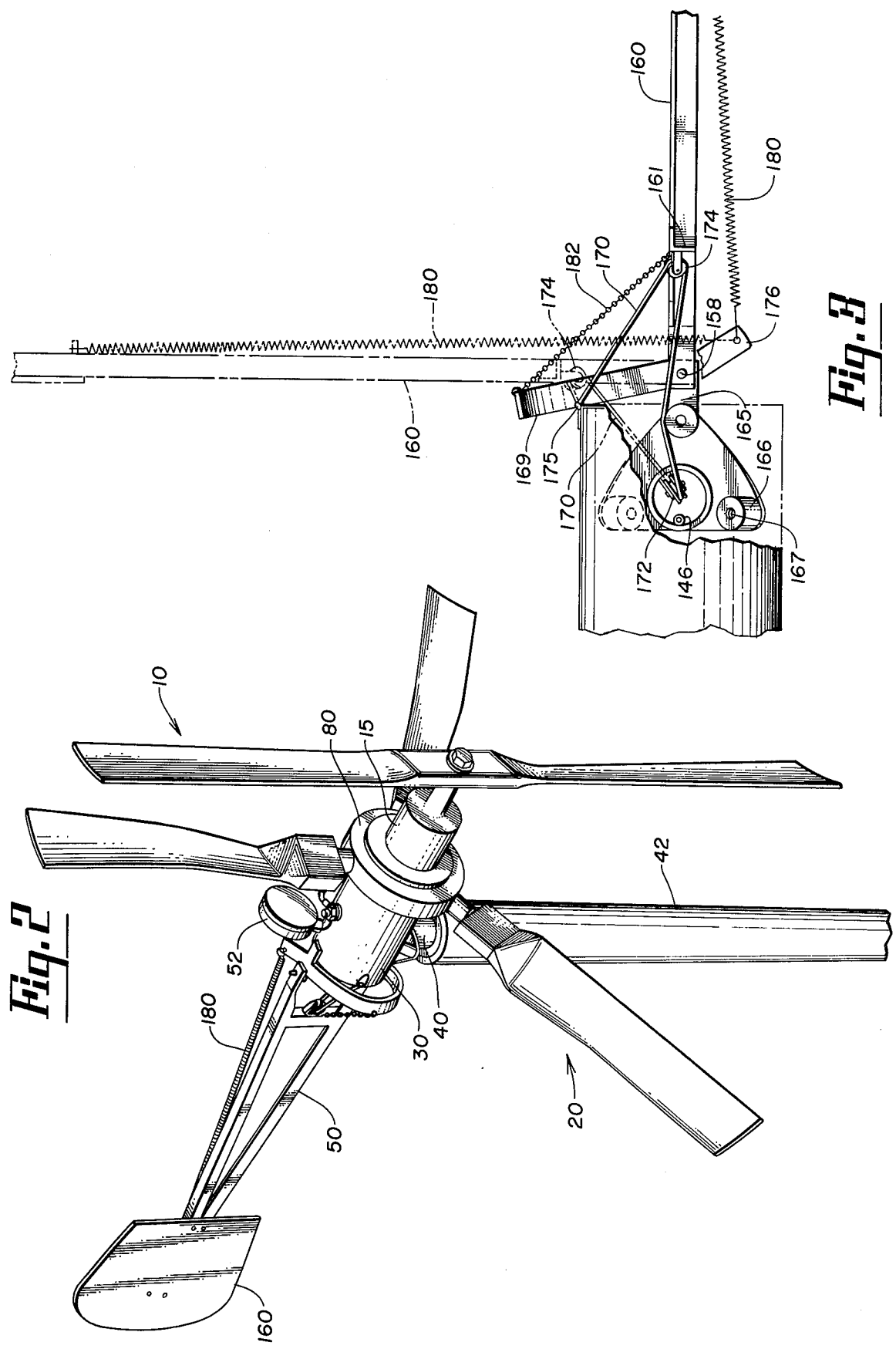

WIND OPERATED GENERATOR

My invention relates to a wind operated generator and more particularly to an improved wind operated generator utilizing a dual propellor with a direct, equal and positive drive system for insuring regulated and opposite rotation of the propellors in the operation of the generator.

Wind operated generators and motors are broadly old and well known. Such unit have theretofore utilized the counterrotating propellors for increasing the drive speed and power of the blades supplied to the generator. In my prior U.S. Pat. No. 2,237,857 dated Apr. 8, 1941, I have disclosed such a wind operated generator using counterrotating propellors with the DC generator mounted between the propellor and carried thereby. This wind operated generator carried a suitable journaling support for the generator and propellors on a turntable with means for collecting electric power from the same and directing the same through the turntable and with a counterbalancing means to offset the weight of the generators and propellors. In my prior patent, one propellor was supported on a portion of the generator and within the generator while the remaining part of the generator and the second propellor is supported on the mount carried by the turntable providing an arrangement which was subject to instability and increased bearing wear without the provision of regulation of the propellor speeds or the operation of the generator.

In my improved wind operated generator of the double action type, the electric generator is shown as an alternator having its parts supported on concentric shafts upon which the separate propellors are mounted with both propellors being journaled in a drive housing mounted on the turntable for increased stability. In addition, the direct and positive drive includes gearing to a tie shaft to insure counterrotation of the propellor with equal and opposite rotation of the propellors at all times. My improved generator provides for a dual bladed propellor at the forward end of the generator and a three bladed propellor at the rear to insure that all blades will never be overlaping, thus, increasing the starting characteristics of the same. In addition, the three bladed propellor is of the adjustable pitch type and includes a governor which through the positive drive structure effects the governing action on the forward propellor to provide for operation of the counterrotating propellors at a predetermined speed, matching the propellor speed with the alternator operation for improved generating characteristics and insuring against overloading of the propellor blades and damage to the alternator. The governing action insures that with the predetermined rotation of the propellor blades, proper electrical output can be obtained from the alternator which is regulated. The positive drive structure includes provisions for lubrication to insure for relatively friction free operation, and a suitable counterbalancing tail or vane structure insures proper orientation of the blades with respect to the wind when operating the proper shutdown when operation is not desired.

Thus, the principle object of this invention is to provide an improved double action wind generator with a direct, equal and positive drive system.

Another object of this invention is to provide in such a double action wind generator, means for controlling the propellor speed and hence, the generator speed.

A further object of this invention is to provide an improved wind operated generator using a fixed and variable fixed propellor with a different number of blades to insure positive starting and predetermined speed of operation.

A still further object of this invention is to provide in an improved wind operated generator of this type an improved drive system employing gearing or a tie connection between the propellors to provide for equal and opposite rotation with a positive drive system having a minimum of friction.

Another object of this invention is to provide an improved wind operated generator adapted for use as either an alternating current or direct current generator.

A still further object of this invention is to provide an improved wind operated generator in which the propellor speed may be matched to the speed of the alternate for improved alternator operation.

These and other objects of this invention will become apparent from the reading of the attached description together with the drawings wherein:

FIG. 1 is a side elevation view of the improved wind operated generator;

FIG. 2 is a perspective view of the wind operated generator in an operating position;

FIG. 3 is a plan view of the wind operated generator in an inoperative position with parts broken away; and, FIG. 4 is a sectional view of the wind operated generator taken along the lines 4—4 in FIG. 1.

Figure 4:
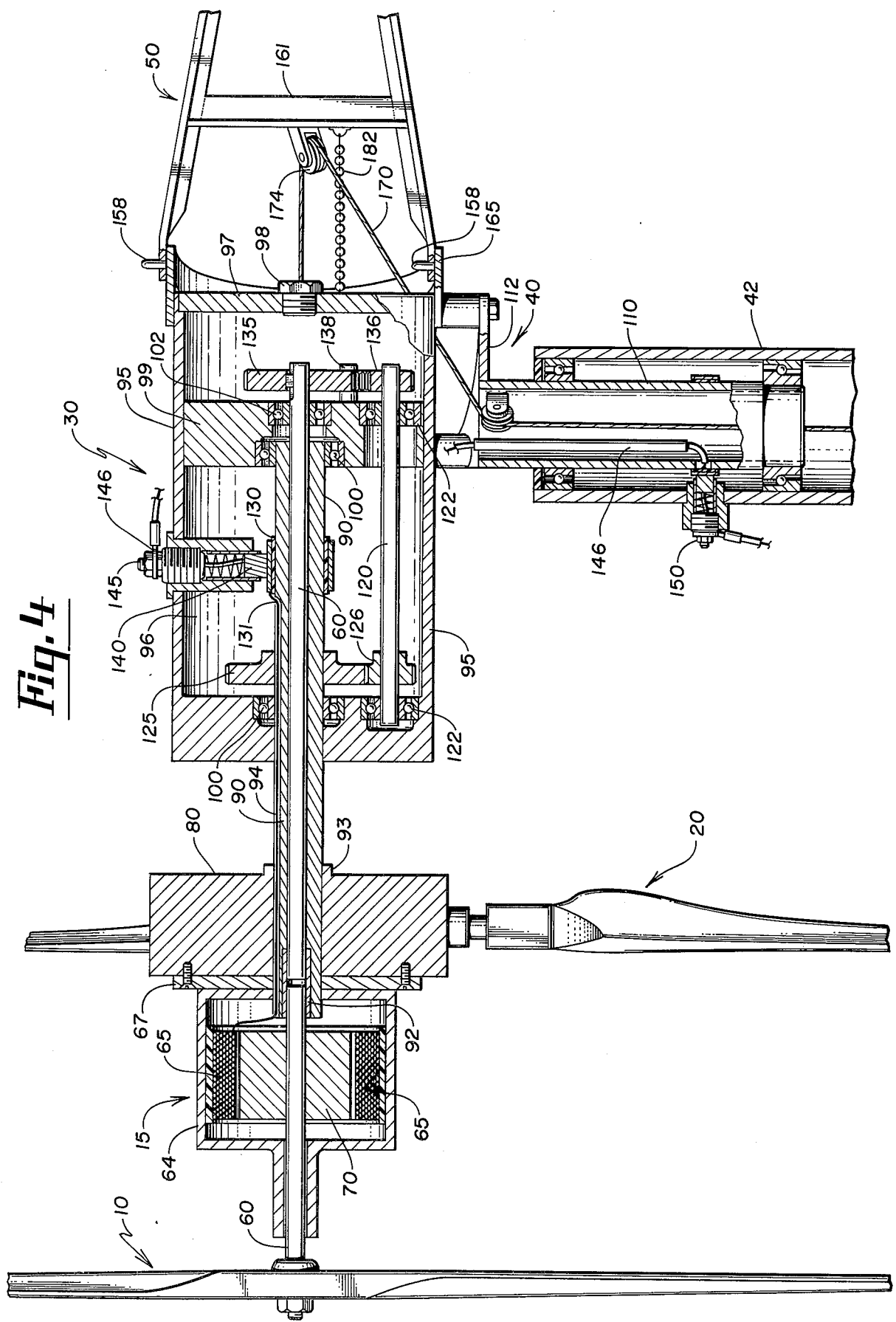

The wind operated generator as will be best seen in FIGS. 1, 2, and 4 includes a pair of propellors 10, 20 mounted with an electrical generator, indicated generally at 15, positioned between the same and spacing the propellors apart. The propellors and generator are supported on a drive mounting structure 30 which in turn is pivotally mounted about a vertical axis on a turntable 40 positioned in the end of a cylindrical support such as a pipe 42 for mounting the generator. Mounted on and coupled to the drive structure 30 is a guide vane or tail section 50 designed to counterbalance the weight of the propellors and generator from the turntable and align the propellor blades with the wind for operating characteristics. Suitable indicating light 52 is shown mounted on the housing for purposes to be later noted.

As will be best seen in FIGS. 1, 2, and 4 the sectional view of FIG. 4, the propellor 10 which is a two bladed propellor is mounted on an inner shaft 60 which is journaled in part in an elongated oil-less bearing section 62 of the frame 64 of the generator 15 which is shown in the drawings as an alternating current generator or alternator. The frame mounts a series of field coils 65 around the inner periphery of the same defining a cylindrical recess in which is positioned a permanent magnet-type armature or field member 70 the armature being polarized or magnetized across the diameter of the same. The alternator frame and winding section is connected by means of the flange 67 to a governor section 80 of the second or rear propellors 20 which as will be noted in FIGS. 2 and 3 is a three bladed propellor. Three blades are used in connection with second propellor 20 so that the blades of the two propellors will never be in synchronism or alignment at any one time thus, insuring ease in starting of the wind generator. The propellors are basically made of the same length of blade, and the blades of the propellor 20 with the rear propellor are adjustable and pitched through the governor mechanism 80 which is shown in block in the sectional view since its details form no part of the present dimension. It would be basically a flyballs type governor mechanism adjusting the pitch of the blades of the propellor 20 to limit the maximum speed of the rotation of the propellors in a counterrotating direction, which will be hereinafter noted. The alternator will provide a single phase output and it will be understood that the alternator could have an energized rotor section through suitable slip rings and conductors or the generator could be of the DC type with an energized field winding or permanent magnet field and with the armature conductors being connected through a suitable commutator structure to the output of the wind generator, as will be hereinafter described.

The governor section 80 of the second propellor is mounted on the second or outer shaft 90 which is hollow and journals the inner shaft 60. A suitable brass coupling 92 is positioned in the end of this shaft for the purpose of insulating or isolating the permanent magnet armature 70 from the remaining portion of the structure. The frame parts of the alternator and the flanges 67 and preferably made of aluminum so that the permanent magnet field will be affected only in generating a flux to the windings 65 of the alternator. The shaft 90 also includes a collar section 93 positioned behind the governor to locate the governor 80 and the second propellor 20 on the end of the second shaft. This shaft also includes a groove 94 through which a conductor or conductors from the windings 65 will be fed through the positive drive structure 30 and the turntable 40. The positive drive structure 30 includes a housing 95 having a general recessed area 96 therein and a removable end cap 97 thereon and a removable plug 98 in the end cap. A cylindrical partition or member 99 is secured within the recess and the solid ends of the housing and the partition 99 having suitable bearings 100 mounted therein for journaling the outer shaft 90 within the positive drive structure 30. The inner shaft 60 is journaled in the outer shaft and is also journaled by a bearing 102 mounted in the cylindrical partition 99 which journals the free end of the inner shaft 60 projecting beyond the confines of the outer shaft and the cylindrical partition 99. Housing 95 of the positive drive structure is journaled through the turntable 40 by means of an inner sleeve 110 which is mounted in flange structure 112 of the turntable coupled to the housing 95 of the drive structure for supporting the wind generator.

The positive drive structure 30 includes gearing coupling both the inner and outer shafts to a tie shaft 120 which is journaled in the housing 95 through a bearing 122 in the end of the housing and in the partition 99. A shown in FIG. 4, the outer shaft 90 mounts a large drive gear 125 which meshes with a driven gear 126 mounted on or connected to the tie shaft 120. The The inner shaft 60 mounts a second drive gear 135 which is coupled to a pinion or driven gear 136 through an idler gear 137, the idler gear 137 being journaled on a stub shaft 138 and mounted in the partition 99. The idler gear in effect changes the rotation of the gearing combination 135, 136 so that the counterrotating inner and outer shafts 60 and 90 respectively will drive the tie shaft 120 in the same direction and at the same speed. While gearing is shown for tieing the inner and outer shafts to the tie shafts 120 in the positive drive structure, it will be understood that a sprocket arrangement may be employed between the outer shaft and the tie shaft and a similar sprocket and drive arrangement between the inner shaft and the tie shaft with suitable means for reversing the directional rotation (not shown).

Mounted on the outer shaft 90 and within the recess 97 of the housing 95 of the positive drive structure is a slip ring member 130 which is connected to a conductor 131 leading to the groove 94 in the outer shafts to the winding or windings 65 on the alternator. It will be understood that whenever the rotor element is to be energized externally or from an electrical source, that additional slip rings will have to be included to provide the transfer of electric power from outside of the housing 95 of the positive drive structure through the shafts to the rotor. Similarly, where a DC generator is employed, the armature will have a conventional commutator brush arrangement with the brushes being connected through conductors positioned in the grooves 94 and to additional slip rings mounted on the outer shaft. For simplicity purpose a permanent magnet field element is shown in the alternating current generator, the single conductor connecting the windings 65 to the slip rings 130 and through a suitable brush arrangement indicated at 140 to an insulated power terminal 145 mounted on the outside of the housing 95 of the positive drive structure. This will be connected through a suitable lead 146 and the support structure 110 of the turntable to a suitable pivoted coupling 150 or slip ring arrangement leading through the post 42 supporting the wind generator. It will be understood that when a single conductor is used, the metallic ground through the structure will be employed to complete the electrical circuit.

The housing 95 of the positive drive structure is designed to include an oil reservoir in the recess 96 or oil within the housing of the recess to provide suitable lubrication to the gearing. Similarly, the aperture 98 in the cap 92 of the housing provides an easy access for introduction of oil into the reservoir and also for means for checking the speed of rotation of the shafts by the insertion of a suitable tachometer probe (not shown).

Mounted on the housing 95 of the positive drive structure and through suitable pivot members indicated at 158 are tail or boom member 160 of the tail section 50 having a suitable cross support 161 and a fin 162 at the end of the same to provide a conventional vane and counterbalance for the propellors and generator mounted on the opposite end of the positive drive structure housing. The boom members 160 are mounted on flanges 165 attached to and suitably secured to the housing 95 of the drive structure. The turntable plate 112 is positioned on the bottom portion of the housing 95 of the drive structure and spaced therefrom with suitable spacer members 166 and bolts 167 securing the same thereto. The pipe 110 in the plate 112 provides access for a cable mechanism 170 leading to the tail structure for pivoting the same as will be hereinafter identified. It also provides, as will be seen in FIG. 4, for housing the conduct 146 leading from the insulated terminal 45 on the housing through the turntable. Positioned on the flanges 165 is a semicircular bumper flange 169 which limits in one direction the pivot action of the boom members 160 of the tail section in the shutdown position. The bumper 169 is fixed to the flanges 165 and bears against the housing defining the limit of rotation of the tail section in this direction. Within the pipe 112 leading through the turntable plate is a pulley 172 upon which the cable 170 is positioned, the cable extending around one of the spacer members 166 and to a second pulley 174 mounted on the cross support 161 of the boom members. The opposite ends of the cable is attached to the bumper or housing, as at 175. A second flange 176 fixed to the upper flange 165 mounting the boom members provides an anchoring support for one end of the coil spring 180 extends to the fin 162 and applies a bias to the fin and boom members in a direction to stream the tail section or align the same with the shafts of the propellors and generator. A suitable chain 182 connected between the bumper 169 and the cross member 161 limits the movement of the boom in the direction of the influence of the spring whenever the cable system is relaxed. This will define the alignment position of the tail section with the shafts of the propellors. Whenever the cable is shortened by winding the same on a suitable winch (not shown) and on the post support 42 for the turntable, the effect of shortening the length of the cable will draw the boom members toward the bumper 169 and hold the same against the tension of the spring 180 to shut down the wind generator by displacing the tail section substantially normal to the direction of the propellor shaft, thus, removing the propellors from the alignment with the prevailing wind. The generator may be placed in operation by release of the winch allowing the cable 170 to relax and lengthen across the pulleys 172, 174 such that the spring 180 may bring the boom members into alignment with the axes of the drive support and propellor moving the propellors into the wind to cause rotation of the same. This movement will be limited by the length of the chain 182 which will align the boom members with the axes of the propellors. Thus, by shortening the cable mechanism, the wind generator may be shut down and by extending the same or releasing the same, the spring associated with the tail section will stream the tail section to an operative position causing the propellors to face into the wind and rotate.

The positive drive structure 30 associated with the propellors 10, 20 insures propellors will rotate in equal and opposite directions since their supporting shafts 60, 90 which are journaled in the housing 95 of the positive drive structure are tied together through gearing having the same gear ratio. Thus, as an example, the gears 125, 126 have the ratio of 52/26 gear teeth or 2/1 and the gears 135, 136 with the idler gear 137 bear the ratio of 2/1 or 48 and 24 teeth respectively. Thus, the equal or opposite rotation of the propellors through their supporting shafts will be coupled to the tie shaft 120 to insure that the shafts 60, 90 will rotate simultaneously and in opposite directions and at the same speed. The governor 80 associated with the propellor 20 will effect a limit on the speed of rotation on the forward propellor 10 and the governor may be adjusted and the propellors sized to provide for a predetermined rotation sufficient to operate the alternator 15 at a desired speed to provide a single phase, 60 cycle output. As shown in FIG. 2, the indicating light 52 is tied through a suitable phase sensitive circuit (not shown) coupled through a positive terminal 145 to illuminate whenever the propellors are operating at a predetermined speed of rotation in equal and opposite directions rotating the parts of the alternator 15 to generate a single phase alternating current of the desired frequency. With the phase sensing light energized, the power circuit from the turntable may be utilized or completed to energize suitable electrical equipment from a stable alternating current source. The governor also prevents overspeed of the propellors and injury to the alternator parts. Although the indicating light 52 may be particularly applicable in the case of the alternator for proper phase sequence and frequency of output, a similar voltage sensitive light may be utilized in connection with the direct current generator to indicate a voltage level of output for a predetermined speed of rotation. The desired speed of operation of the generator parts will be similarly related to the propellors and controlled through the governor associated with one of the propellors for proper DC generator operation with fixed field energization.

In the operation of the generator, the suitable cable mechanism 170 will permit the release of the tail section to a streamed or aligned position through the influence of spring 172 where the axis of the shafts 60, 90 which support the propellors 10, 20 and the generator parts are aligned with the tail section. The use of the three bladed propellor with a two bladded propellor insures that all blades will never be in an overlapping position and consequently, the presence of any wind when the tail is streamed will provide for rotation of the propellors in equal and opposite directions until the desired speed of rotation is reached. This will be determined by the setting of a governor which will also prevent an overspeed condition. The governor effects the change of pitch of the propellor blades 20 to limit speed of rotation and because of the tie shaft 120 and the coupling of the same to the inner shaft, the forward propellor 10 is limited in its speed of rotation. With the governed rotation of the wind operated generator, the alternator may operate at a relatively fixed speed of rotation to provide an alternating current output of the single phase type at the desired frequency for use in energization of associated electrical equipment connected thereto. The lubrication of the gearing in the tie shaft minimizes frictional forces and the couplings other than all gearing may be utilized to tie the rotation of the shafts together. Similarly, an alternating current generator of the permanent magnet field type is shown in the drawings but it will be understood that energized field windings or the direct current generator may be employed within the scope of the present invention. Therefore, I wish to be limited only by the appended claims.

What I claim is:

1. A wind operated generator comprising, a pair of propellors each having blades with respectively opposite pitch and mounted respectively on a pair of concentric shafts, one of said propellors having a pair of blades thereon and the other of said propellors has three blades thereon such that all blades of said propellors will never be in alignment, an electric generator disposed between and spacing the propellors from each other and mounted on said shafts, said generator including a field part and a winding part with said parts being coupled respectively to said shafts and said propellors for rotation relative to one another, a positive drive structure including a housing mounted on a turntable and mounting and journaling said pair of concentric shafts, said positive drive structure including a tie shaft journaled in the housing, first coupling means coupling said one of said shafts to said tie shaft and having a predetermined speed ratio, a second coupling means coupling other of said shaft to said tie shaft and having the same predetermined speed ratio with means for reversing the direction of rotation such that said tie shaft rotates in the same direction and at the same speed to cause equal and counterrotation of the propellors at all times; one of said propellors having a governor mechanism associated therewith so as to govern rotation of the shaft associated therewith and through said tie shaft the rotation of the other propellor mounted on the other of the concentric shafts, and means in the housing of said positive drive structure and cooperating with the slip ring on one of said shafts for coupling the winding part of said generator through said turntable.

2. The wind operated generator of claim 1 in which the electric generator is an alternator with the field part being a permanent magnet field.

3. The wind operated generator of claim 1 in which the first of a pair of concentric shafts mounting the outermost propellor carries the permanent magnet field or the generator and the second of the concentric shafts mounts the innermost propellor and carries the winding part and a housing for the same enclosing permanent magnet field of the electric generator with said second of said concentric shafts being journaled in said positive drive structure and journaling said first of said shafts.

4. The wind operated generator of claim 1 in which the positive drive structure includes the housing filled with an oil for lubrication of the gearing means therein.

5. The wind operated generator of claim 2 in which the alternator includes a permanent magnet field and a winding part with a permanent magnet field associated with the two bladed propellor and the winding part coupled through a housing to the three bladed propellor and with a governor positioned on the three bladed propellor and including a conductor means extending along and rotating with the outer concentric shaft through housing of the positive drive structure to a slip ring mounted on the outer shaft in said housing and being coupled thereto with a conductive brush positioned on and extending through said housing of the positive drive structure.

6. The wind operated generator of claim 5 and including a tail structure connected to said positive drive housing and extending a direction opposite to the extent of the said concentric shafts of the propellors thereon.

7. The wind operated generator of claim 6 and including means adapted to pivot the tail structure relative to the housing to displace the same normal to the concentric shafts with the propellor thereon whenever the generator is to be shut down.

8. The wind operated generator of claim 7 and including a support structure on the turntable for coupling the slip ring in the positive drive structure through the pivotal axis of the turntable and including a cable mechanism and spring comprising the means for rotating the tail structure relative to the positive drive structure.

9. The wind operated generator of claim 1 in which the electric generator is a DC generator with the armature and field being coupled respectively to the pair of propellors and with electric coupling means coupled to an outer of the concentric shafts to provide a coupling of the armature from the generator to the means in the housing.

10. The wind generator of claim 1 in which the one of the propellors having the governor mechanism associated therewith has adjustable pitch propellor blades mounted on and adjusted by the governor mechanism.

11. A wind operated generator comprising, a pair of propellors having respective blades of opposite pitch, an electric generator exposed between and spacing said propellors from each other, a pair of concentric shafts including an inner and outer shaft mounting respectively said propellors, said electric generator including a permanent magnet field part and a winding part with a housing coupled respectively to said concentric shafts and associated with said propellors for rotation relative to one another in opposite directions, said propellor being mounted on the inner shaft being a two bladed propellor and mounting the permanent magnet field of the generator with the other propellor being mounted on the outer concentric shaft and coupled to the housing and winding of the generator for rotation therewith, a positive drive structure including a housing mounting said outer concentric shaft, said positive drive structure being mounted through a turntable and adapted to be coupled to a support structure, said positive drive structure including a first set of gearing coupling said outer shaft to a tie shaft journaled in said housing of the positive drive structure, a second set of gearing having the same gear ratio coupling the inner shaft to said tie shaft, additional gearing means associated with said second gearing for reversing the effective direction of rotation of said inner shaft to couple to said tie shaft with same rotation as the outer concentric shaft to provide for rotation of the tie shaft in the same direction and at the same speed; an oil reservor positioned in said housing of the positive drive structure for lubricating said gearing, electrical conductor means connecting said winding of said generator along the surface of said outer shaft and through said housing of said positive drive structure to a slip ring mounted on said outer shaft within said housing and brush means positioned on said housing of said positive drive structure and cooperating with said slip ring for directing electric current from said winding through said turntable.

* * * * *